(12) United States Patent
Henion

(10) Patent No.: US 12,503,048 B2
(45) Date of Patent: Dec. 23, 2025

(54) REAR-VIEW SYSTEM AND VEHICLE

(71) Applicant: Motherson Innovations Company Limited, London (GB)

(72) Inventor: Paul R. Henion, Marysville, MI (US)

(73) Assignee: Motherson Innovations Company Limited, London (GB)

( * ) Notice: Subject to any disclaimer, the term of this patent is extended or adjusted under 35 U.S.C. 154(b) by 401 days.

(21) Appl. No.: 18/182,471

(22) Filed: Mar. 13, 2023

(65) Prior Publication Data
US 2023/0302995 A1    Sep. 28, 2023

(30) Foreign Application Priority Data
Mar. 22, 2022  (DE) ..................... 10 2022 106 713.0

(51) Int. Cl.
*B60R 1/074* (2006.01)
*B60R 1/12* (2006.01)

(52) U.S. Cl.
CPC ............ *B60R 1/074* (2013.01); *B60R 1/12* (2013.01); *B60R 2001/1215* (2013.01); *B60R 2001/1223* (2013.01); *B60R 2001/1253* (2013.01)

(58) Field of Classification Search
CPC ... B60R 1/074; B60R 1/12; B60R 2001/1215; B60R 2001/1223; B60R 2001/1253; B60R 1/26
USPC ......................................................... 359/841
See application file for complete search history.

(56) References Cited

U.S. PATENT DOCUMENTS

| | | | | |
|---|---|---|---|---|
| 4,558,930 A * | 12/1985 | Deedreek | ............. | G02B 7/1827 359/881 |
| 5,375,014 A * | 12/1994 | Fujie | ...................... | B60R 1/074 359/877 |
| 5,572,376 A * | 11/1996 | Pace | ...................... | B60R 1/078 359/872 |
| 6,276,805 B1 * | 8/2001 | Horne | ..................... | B60R 1/076 248/512 |
| 6,325,518 B1 * | 12/2001 | Whitehead | ............. | B60R 1/078 248/478 |
| 6,755,543 B1 * | 6/2004 | Foote | ..................... | B60R 1/078 359/872 |
| 6,877,868 B2 * | 4/2005 | Olijnyk | ................... | B60R 1/078 359/872 |

(Continued)

OTHER PUBLICATIONS

German Patent Office, Appl. 10 2022 106 713.0, Office Action, Nov. 11, 2022.

*Primary Examiner* — Ricky D Shafer
(74) *Attorney, Agent, or Firm* — Jones Day

(57) ABSTRACT

The present disclosure refers to a rear-view system for a vehicle which includes a bracket mountable to the vehicle and a rear-view head telescopically mounted to the bracket. The rear-view system further includes at least one of a reflective element or a camera mounted on the rear-view head such that the at least one of the reflective element or the camera is movable with the rear-view head. The rear-view system further includes a position sensor configured to generate a signal indicative of a telescopic position of the rear-view head with respect to the bracket. A processor is configured to receive at least one image from the camera and the signal from the position sensor. The display is configured to receive at least one modified image from the processor. The present disclosure also refers to a vehicle with such a rear-view system.

20 Claims, 12 Drawing Sheets

(56) References Cited

U.S. PATENT DOCUMENTS

| | | | | |
|---|---|---|---|---|
| 7,165,853 B2* | 1/2007 | Gilbert | .................. | B60R 1/1207 |
| | | | | 359/881 |
| 7,748,857 B2* | 7/2010 | Fimeri | .................... | B60R 1/078 |
| | | | | 248/479 |
| 9,969,333 B2* | 5/2018 | Ervin | ........................ | B60R 1/07 |
| 2004/0246608 A1 | 12/2004 | Wellington et al. | | |
| 2014/0376119 A1* | 12/2014 | Sobecki | .................. | B60R 1/082 |
| | | | | 359/841 |
| 2021/0291741 A1 | 9/2021 | Wilson et al. | | |
| 2022/0121003 A1* | 4/2022 | Nolf | .................... | G02B 7/1821 |

* cited by examiner

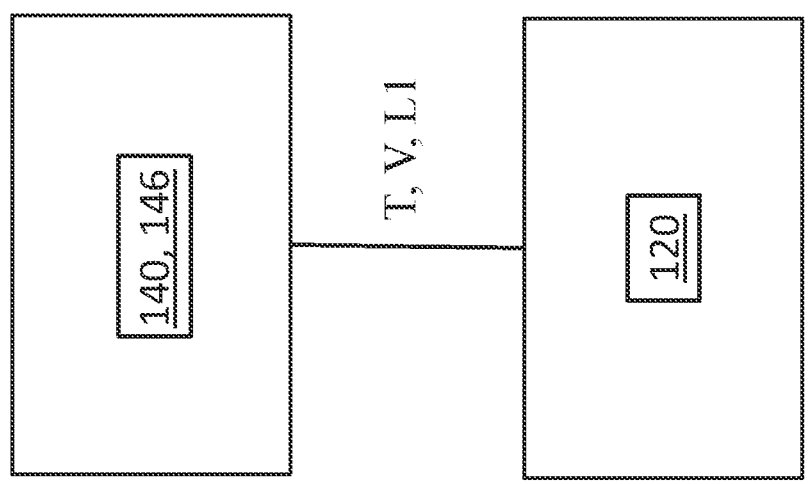
FIG. 8

REAR-VIEW SYSTEM AND VEHICLE

CROSS-REFERENCE TO RELATED APPLICATION

This application claims priority to German Patent Application No. DE 10 2022 106 713.0, filed on Mar. 22, 2022, the entirety of which is incorporated herein by reference for all purposes.

TECHNICAL FIELD

The present disclosure relates generally to a rear-view system, and more specifically, to a rear-view system for a vehicle, and a vehicle with at least one such rear-view system.

BACKGROUND

Vehicles typically include one or more external rear-view systems. Such rear-view systems generally include rear-view heads that are adapted to be adjusted at desired positions. For example, the rear-view head may be selectively moved towards and away from a body of the vehicle. Some rear-view systems may typically include an image acquisition device, such as a camera, fixedly coupled to the rear-view head. The camera may also move along with the rear-view head when adjusted to the desired positions.

Images captured by the camera may typically be electronically transmitted to an output device mounted inside the vehicle. Conventional camera software may adjust the image (e.g., image cropping, resizing, rotation, etc.) for one fixed position of the camera or the rear-view head with respect to the body of the vehicle. Thus, the camera software may apply the same adjustments for all the positions of the rear-view head. Therefore, the images may not be optimized and compatible for viewing on the output device.

SUMMARY

It is one object of the present disclosure to provide a rear-view system for a vehicle overcoming the problems of the prior art.

This object is achieved according to claim 1. Embodiments of the present disclosure are described in claims 2 to 11.

In one aspect, the present disclosure provides a rear-view system for a vehicle. The rear-view system includes a bracket mountable to the vehicle. The rear-view system further includes a rear-view head telescopically mounted to the bracket. The rear-view system further includes at least one of a reflective element or a camera mounted on the rear-view head such that the at least one of the reflective element or the camera is movable with the rear-view head. The rear-view system further includes a position sensor configured to generate a signal indicative of a telescopic position of the rear-view head with respect to the bracket. The rear-view system further comprises a processor and the signal from the position sensor is sent to the processor.

The rear-view system may consider the telescopic position of the rear-view head with respect to the bracket. Thus, the rear-view system may be able to apply adjustments to images obtained from the camera based on the telescopic position of the rear-view head with respect to the bracket.

In an example, the rear-view system wherein the processor is communicably coupled to the camera. The processor may be configured to receive the signal from the position sensor and at least one image generated by the camera. The processor may be configured to generate at least one modified image by modifying the at least one image generated by the camera based on the telescopic position of the rear-view head with respect to the bracket.

In an example, the rear-view system may further include a display communicably coupled to the processor. The display may be configured to display the modified image.

In an example, the processor may be remote from the camera and the rear-view head.

In an example, the position sensor may include a potentiometer configured to output a varying voltage based on the telescopic position of the rear-view head with respect to the bracket.

In an example, the potentiometer may include a slip clutch.

In an example, the rear-view head may be telescopically movable with respect to the bracket between a retracted position and an extended position. The position sensor may include at least one limit switch configured to sense whether the rear-view head is at the retracted position or the extended position.

In an example, the position sensor may include a plurality of contact switches configured to sense a plurality of telescopic positions of the rear-view head.

In an example, the rear-view system may further include a pair of spaced apart substantially parallel hollow outer arm assemblies extending from the bracket. Each outer arm assembly may include a front portion and a rear portion. The front portion may include a rack extending longitudinally along the outer arm assembly towards a distal end. The rear-view system may further include a pair of spaced apart substantially parallel inner arm assemblies mounted to the rear-view head and extending into respective outer arm assemblies for relative sliding movement out of and into the respective outer arm assemblies. The rear-view system may further include a pair of driving pinion gears. Each driving pinion gear may be rotatably supported within the rear-view head in a position in line with a respective inner arm assembly from the pair of inner arm assemblies and may engage a respective rack from the racks of the outer arm assemblies.

In an example, the position sensor may be mounted on one of the pair of inner arm assemblies.

In an example, the position sensor may be mounted on one of the pair of outer arm assemblies.

In an example, the rear-view system may further include a pinion drive shaft assembly mounted to the rear-view head and having a drive shaft extending between the pair of driving pinion gears along a drive axis. The rear-view system may further include a drive motor mounted to the rear-view head and having an output shaft. The rear-view system may further include a gear train operatively interposed between the output shaft and the pinion drive shaft assembly. The drive motor may drive the inner arm assemblies to move telescopically with respect to their respective outer arm assemblies.

In an example, the reflective element may be pivotally mounted on the rear-view head.

In an example, the reflective element may be pivotally adjusted based on the telescopic position of the rear-view head with respect to the bracket.

In an example, the camera may face in at least one of a forward direction, a rearward direction, an outward direction, and a downward direction with respect to the vehicle.

In an example, a field of view of the camera may be adjusted based on the telescopic position of the rear-view head with respect to the bracket.

In an example, the camera may include a plurality of cameras having corresponding field of views.

In another aspect, the present disclosure provides a rear-view system for a vehicle, the rear-view system includes a bracket mountable to the vehicle and a rear-view head telescopically mounted to the bracket. The rear-view system further includes a camera, and the camera is mounted on the rear-view head such that the camera is movable with the rear-view head. The rear-view system further includes a position sensor configured to generate a signal indicative of a telescopic position of the rear-view head with respect to the bracket and wherein the signal from the position sensor is sent to a processor.

In another aspect, the present disclosure provides a rear-view system for a vehicle, the rear-view system includes a bracket mountable to the vehicle and a rear-view head telescopically mounted to the bracket. The rear-view system may further include a reflective element, wherein the reflective element is mounted on the rear-view head such that the reflective element is movable with the rear-view head. The rear-view system may further include a position sensor configured to generate a signal indicative of a telescopic position of the rear-view head with respect to the bracket and wherein the signal from the position sensor is sent to a processor.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the disclosure. The figures are not necessarily drawn to scale. Like numbers used in the figures refer to like components. However, it will be understood that the use of a number to refer to a component in a given figure is not intended to limit the component in another figure labelled with the same number.

FIG. 8 illustrates a block diagram of the rear-view system according to an embodiment of the present disclosure.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity and are not intended to limit the scope of the disclosure or the appended claims. Further, it should be understood that any one of the features can be used separately or in combination with other features. Other systems, methods, features, and advantages of the disclosure will be or become apparent to one with skill in the art upon examination of the detailed description. It is intended that all such additional systems, methods, features, and advantages be included within this description, be within the scope of the present disclosure, and be protected by the accompanying claims.

The present disclosure relates to a rear-view system for a vehicle. The rear-view system includes a bracket mountable to the vehicle. The rear-view system further includes a rear-view head telescopically mounted to the bracket. The disclosure encompasses the rear-view system further includes at least one of a reflective element or a camera mounted on the rear-view head such that the at least one of the reflective element or the camera is movable with the rear-view head. The rear-view system further includes a position sensor configured to generate a signal indicative of a telescopic position of the rear-view head with respect to the bracket.

Thus, the rear-view system provided herein comprises either only at least one reflective element, or only at least one a camera, or both a reflective element and a camera.

Figure 1B:
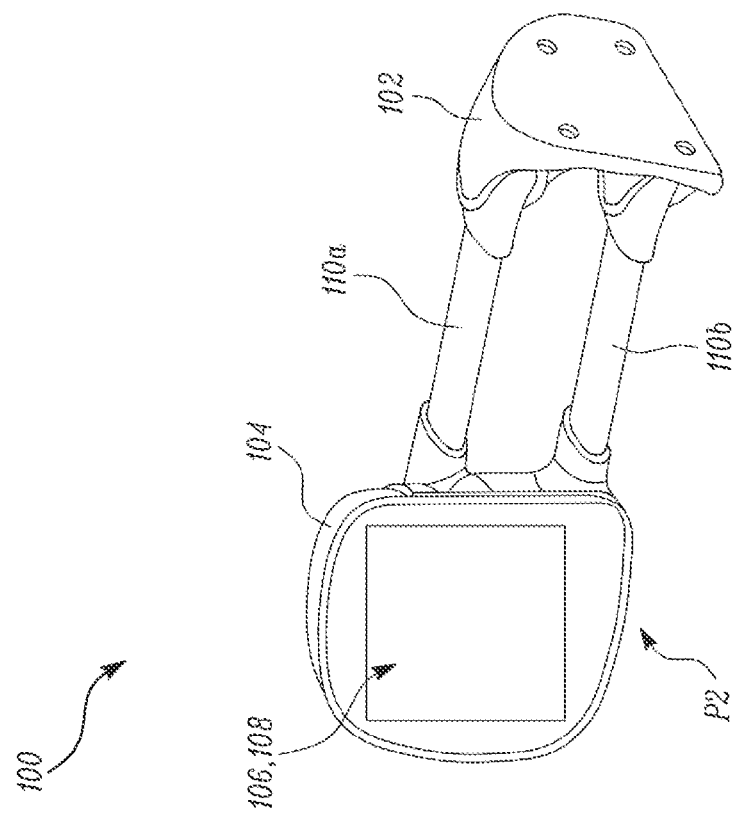
FIGS. 1A and 1B illustrate perspective views of a rear-view system for a vehicle in a retracted position and an extended position, respectively, according to an embodiment of the present disclosure.
Figure 1A:
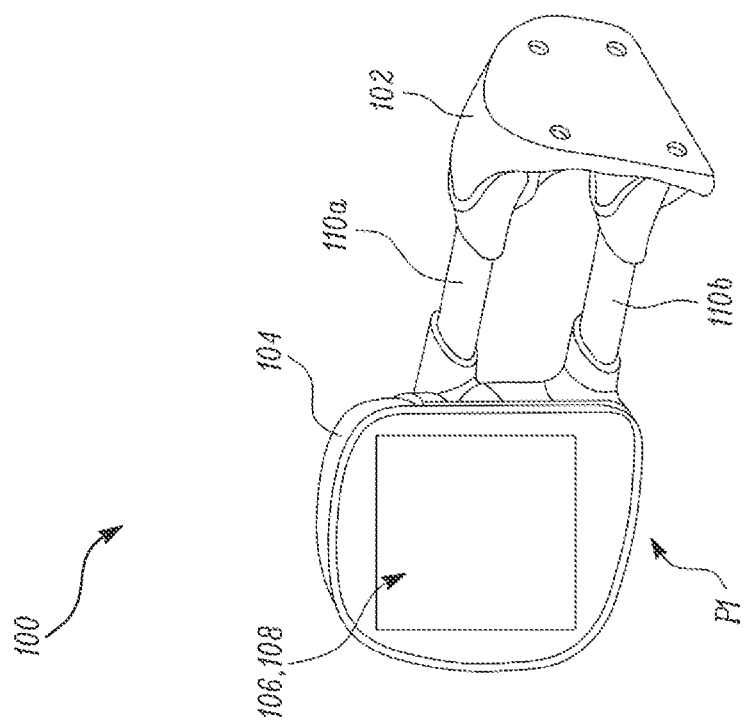

Referring now to the Figures, FIGS. 1A and 1B illustrate an example of a rear-view system 100 for a vehicle (not shown). The rear-view system 100 includes a bracket 102 mountable to the vehicle. In some examples, the bracket 102 may be mountable to a body of the vehicle, for example, via fasteners. In some examples, the bracket 102 attaches to a side of the vehicle.

In some examples, the rear-view system 100 may be installed on a door or a cab of the vehicle. In some examples, the vehicle may be a small truck for towing a trailer. However, the rear-view system 100 may be used with any type of vehicle, for example, cars, buses, trucks, off-road vehicles, motorcycles, aircrafts, bicycles, trams, locomotives, heavy-duty vehicles used in construction and earthworking, and so forth. In some examples, the rear-view system 100 includes a side-view mirror, or spotter mirror which may have a convex shape. The rear-view system 100 may help a driver of the vehicle to view surrounding areas disposed behind and to a side of the vehicle.

The rear-view system 100 further includes a rear-view head 104 telescopically mounted to the bracket 102. In the illustrated example of FIGS. 1A and 1B, the rear-view head 104 has a substantially rectangular shape with rounded edges. However, in other examples, the rear-view head 104 may have any suitable shape, such as circular, elliptical, oval, polygonal, non-regular shape, etc.

The rear-view system 100 further includes at least one of a reflective element 106 and a camera 108. The at least one of the reflective element 106 and the camera 108 is mounted on the rear-view head 104 such that the at least one of the reflective element 106 and the camera 108 is movable with the rear-view head 104. Specifically, the at least one of the reflective element 106 and the camera 108 is fixedly coupled to the rear-view head 104, and therefore, movable telescopically along with the rear-view head 104 with respect to the bracket 102.

In some examples, the rear-view head 104 is telescopically movable with respect to the bracket 102 between a retracted position P1 (shown in FIG. 1A) and an extended position P2 (shown in FIG. 1B). The rear-view head 104 may reach the extended position P2 from the retracted position P1 by translating away from the bracket 102. In other words, in the extended position P2, a distance between the rear-view head 104 and the bracket 102 is greater than a distance between the rear-view head 104 and the bracket 102 in the retracted position P1. A field of view of the rear-view head 104 may be enhanced by moving the rear-view head 104 to the extended position P2 from the retracted position P1. In some examples, the rear-view head 104 may be adjustable manually and/or automatically relative to the bracket 102. For example, the driver may automatically adjust a telescopic position of the rear-view head 104 with respect to the bracket 102 by actuating a switch (not shown) provided inside the vehicle.

In some examples, the rear-view system 100 may also be provided with additional functionality, such as an automatic dimming reflective element, a reflective element defogging/defrosting element, turn indicators, area lights, powered extension, power folding, spotlights, and/or the like.

Figure 2:
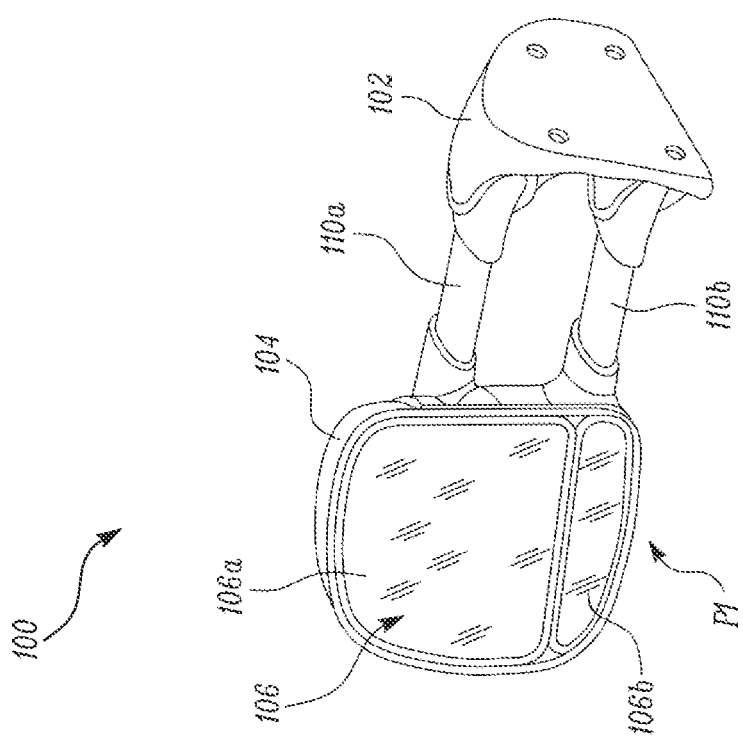
FIG. 2 illustrates a perspective view of the rear-view system in the retracted position and including a reflective element, according to an embodiment of the present disclosure.

FIG. 2 illustrates an example of the rear-view system 100 including the reflective element 106. Specifically, FIG. 2 illustrates the rear-view system 100 including the reflective element 106 in the retracted position P1 of the rear-view head 104.

In some examples, the reflective element 106 may be of any suitable type, such as flat, concave, convex, or a combination thereof. In some examples, the reflective element 106 includes a primary reflective element 106a and a secondary reflective element 106b. In some examples, the secondary reflective element 106b may be a convex mirror. The secondary reflective element 106b may act as a blind spot mirror and may allow the mirror to reflect objects from a wider range of angles than is possible with the primary reflective element 106a. However, the secondary reflective element 106b is optional, and in some examples, the primary reflective element 106a may be provided.

In some examples, the reflective element 106 is pivotally mounted on the rear-view head 104 such that an orientation of the reflective element 106 may be adjusted with respect to the rear-view head 104. In some examples, the rear-view head 104 may include any suitable actuator (not shown) arranged to change the orientation of the reflective element 106 when desired.

Figure 3:
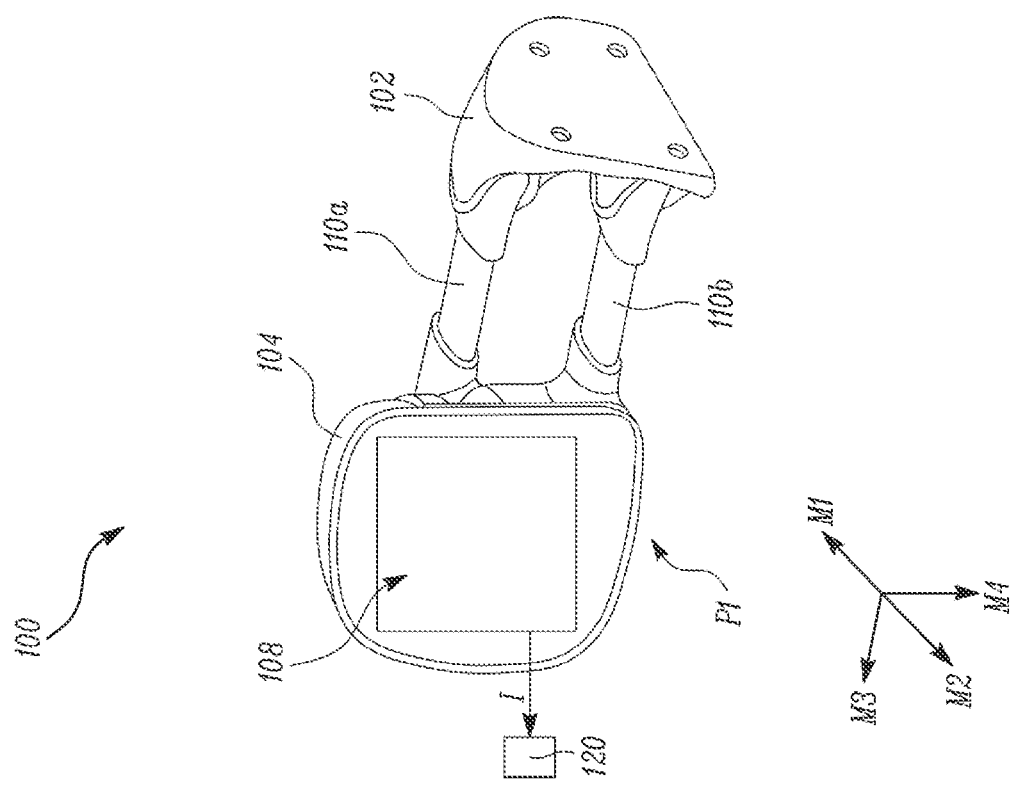
FIG. 3 illustrates a perspective view of the rear-view system in the retracted position and including a camera, according to different embodiments of the present disclosure.

FIG. 3 illustrates an example of the rear-view system 100 including the camera 108. Specifically, FIG. 3 illustrates the rear-view system 100 including the camera 108 in the retracted position P1 of the rear-view head 104. Referring now to FIG. 3, in some examples, the rear-view system 100 further includes a processor 120 communicably coupled to the camera 108. The rear-view system 100 may also include the processor 120 located in the vehicle (not shown) as part of an Electronic Control Unit (ECU). The camera 108 is configured to generate at least one image I. In some examples, the processor 120 transmits the at least one image I generated by the camera 108 to the processor 120. The at least one image I is interchangeably referred to hereinafter as "the image I".

In some embodiments, the processor 120 may be embodied in a number of different ways. For example, the processor 120 may be embodied as various processing means, such as one or more of a microprocessor or other processing elements, a coprocessor, or various other computing or processing devices, including integrated circuits, such as, for example, an ASIC (application specific integrated circuit), an FPGA (field programmable gate array), or any other suitable device for receiving, processing, storing, and communicating data. In some embodiments, the processor 120 may be configured to execute instructions stored in a memory provided with the processor 120 or otherwise accessible to the processor 120.

As such, whether configured by hardware or by a combination of hardware and software, the processor 120 may represent an entity (e.g., physically embodied in circuitry—in the form of processing circuitry) capable of performing operations according to some embodiments while configured accordingly. Thus, for example, when the processor 120 is embodied as an ASIC, FPGA, or the like, the processor 120 may have specifically configured hardware for conducting the operations described herein. Alternatively, as another example, when the processor 120 is embodied as an executor of software instructions, the instructions may specifically configure the processor 120 to perform the operations described herein.

In short, the processor 120 may include any suitable combination of software, firmware, and hardware. Further, the processor 120 may include a logic and any appropriate interface for receiving inputs and providing outputs. The logic may include any information, application, rule, and/or instruction stored or executed by the processor 120. The processor 120 may additionally include (or be communicatively coupled to) one or more memory modules. The memory modules may be non-transitory and may include any type of volatile or non-volatile memory, including, without limitation, magnetic media, optical media, random access memory (RAM), read-only memory (ROM), removable media, an optical storage device, or any other suitable local or remote memory component.

In some examples, the processor 120 is remote from the camera 108 and the rear-view head 104. Specifically, the processor 120 is located remote from the rear-view head 104 and coupled to the camera 108 through, e.g., one or more wiring harnesses and/or coaxial cables. In some examples, the camera 108 may be communicably coupled to the processor 120 via one or more wired and/or wireless communication interfaces. In some examples, the wireless communication interface may communicate data via one or more wireless communication protocols, such as Bluetooth, infrared, Wi-Fi, wireless universal serial bus (USB), radio frequency (RF), near-field communication (NFC), or generally any wireless communication protocol.

It is to be noted that the camera 108 and the processor 120 are shown schematically in FIG. 3 for the purpose of illustration. Specifically, the processor 120 is shown coupled to the camera 108 in FIG. 3 for illustrative and descriptive purposes. Further, it should be noted that the processor 120 may be disposed on the vehicle at any desired location based on application requirements.

It should be understood that the camera 108 may be of any type of a digital or analog camera including, but not limited to, a CMOS (Complementary Metal Oxide Semiconductor) image sensor, a CCD camera (charge couple device imaging means), a night vision camera (e.g., an infrared camera), or the like for imaging a still or a motion picture image. In some examples, the camera 108 may be a part of a night vision system that provides the driver with enhanced viewing of the surrounding environment through a wider field of vision as well as improved visibility when it is dark. In some examples, the camera 108 may be a part of an obstacle detection and/or a collision-avoidance system. In some examples, the camera 108 may face in at least one of a forward direction M1, a rearward direction M2, an outward direction M3, and a downward direction M4 with respect to the vehicle (now shown).

Figure 4:
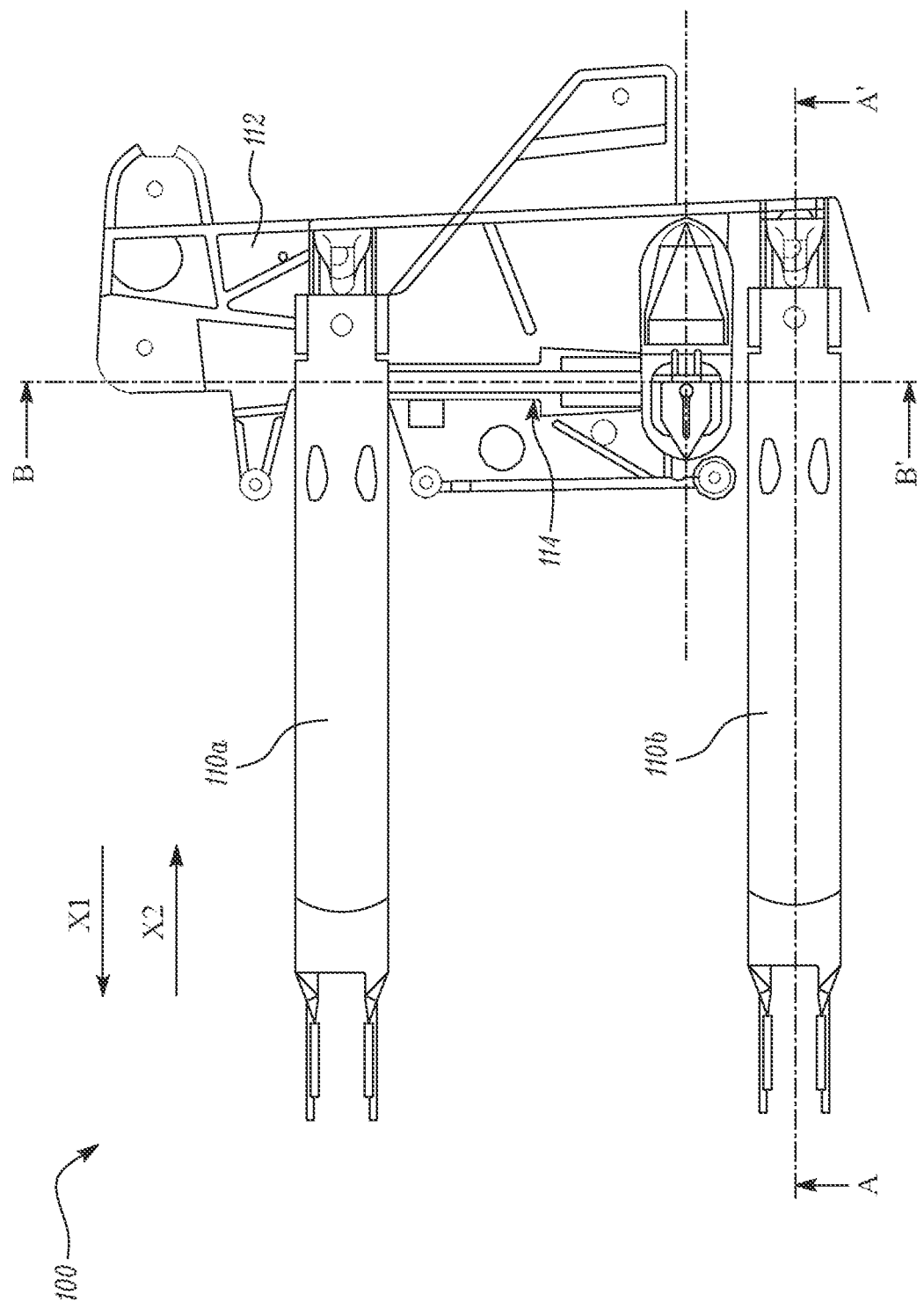
FIG. 4 illustrates a schematic rear view of the rear-view system of FIGS. 1A and 1B, according to an embodiment of the present disclosure.

FIG. 4 illustrates a rear view of the rear-view system 100. Some components (e.g., the rear-view head 104) of the rear-view system 100 are not shown for clarity. Referring now to FIGS. 1A-4, in some examples, the rear-view system 100 further includes a pair of spaced apart substantially parallel hollow outer arm assemblies 110a, 110b extending from the bracket 102. In some examples, the rear-view head 104 may be pivotable with respect to the outer arm assemblies 110.

The rear-view system 100 further includes a case frame 112 (shown in FIG. 4) and a pinion drive shaft assembly 114 (shown in FIG. 4) mounted to the rear-view head 104. The case frame 112 engages with one or more attachment points of the rear-view head 104. The outer arm assemblies 110 may allow the rear-view head 104 and the case frame 112 to be adjusted telescopically with respect to the bracket 102. Specifically, the pinion drive shaft assembly 114 allows the rear-view head 104 to move between the retracted portion P1 and the extended position P2 via the outer arm assemblies 110 towards and away from the bracket 102 as shown in FIG. 4 by arrows X1 and X2, respectively.

Figure 5:
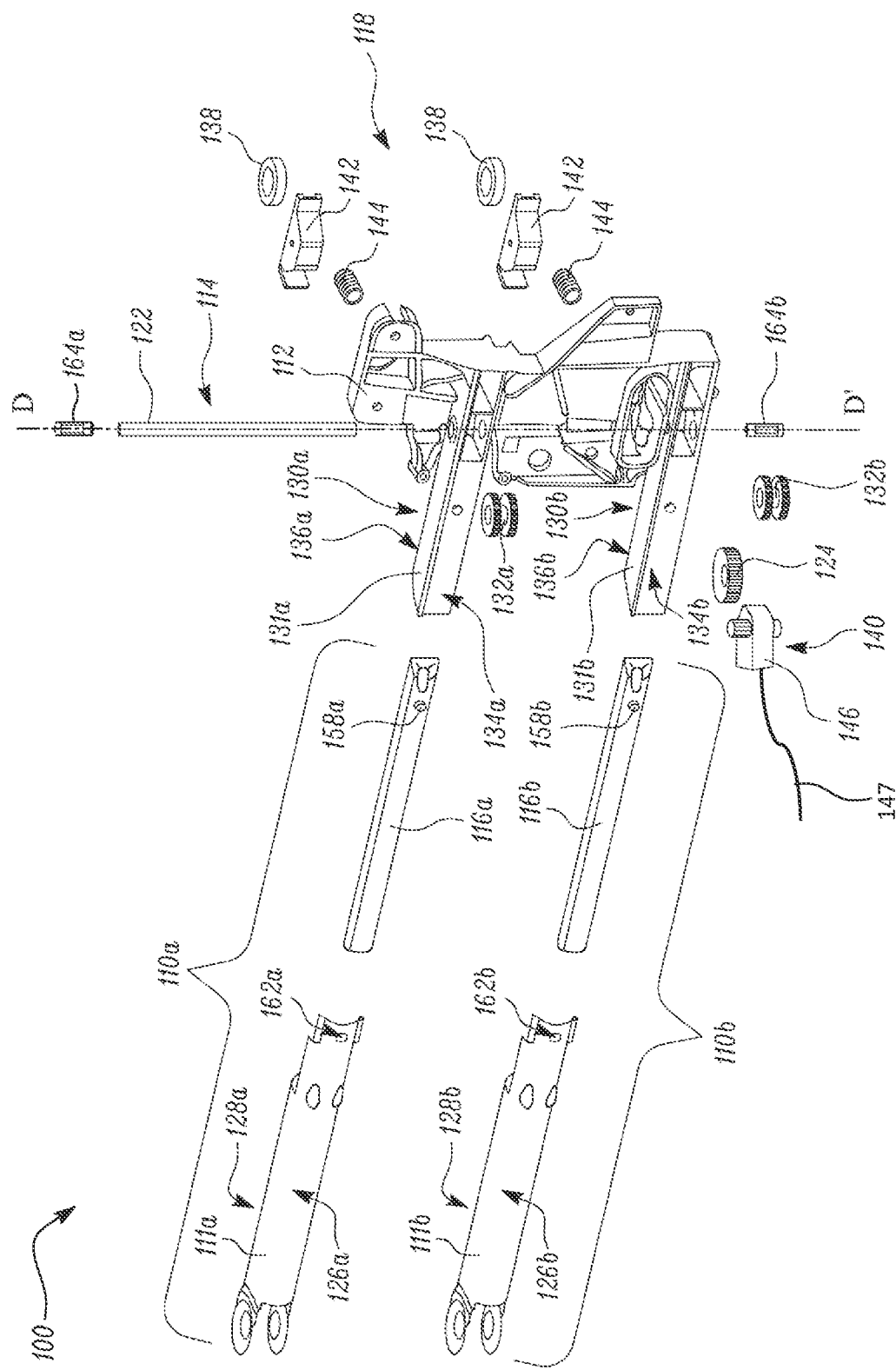
FIG. 5 illustrates an exploded schematic perspective view of the rear-view system of FIGS. 1A and 1B, according to an embodiment of the present disclosure.

FIG. 5 illustrates an exploded view of the rear-view system 100. Referring now to FIGS. 1A-5, in some examples, each outer arm assembly 110a, 110b includes a respective rack 116a, 116b extending longitudinally along the outer arm assemblies 110a, 110b towards a distal end 118. Each outer arm assembly 110a, 110b includes hollow outer tubes 111a, 111b and the racks 116a, 116b may be received within the hollow outer tubes 111a, 111b. In some examples, the racks 116a, 116b are separate parts of the respective outer arm assemblies 110a, 110b. In some examples, the racks 116a, 116b include projections 158a, 158b that engage with respective holes 162a, 162b of the outer tubes 111a, 111b of the outer arm assemblies 110a, 110b. In some other embodiments, the racks 116a, 116b may be integral with the respective outer arm assemblies 110a, 110b.

The rear-view system 100 further includes a pair of spaced apart substantially parallel inner arm assemblies 130a, 130b mounted to the rear-view head 104 or the case frame 112 and extending into respective outer arm assemblies 110a, 110b for relative sliding movement out of and into the respective outer arm assemblies 110a, 110b. In other words, the rear-view head 104 or the case frame 112 may be movable between the extended position P2 and the retracted position P1 based on the sliding movement of the inner arm assemblies 130a, 130b out of and into the respective outer arm assemblies 110a, 110b. In the illustrated example of FIGS. 1A-5, the rear-view system 100 includes the pair of outer arm assemblies 110a, 110b and the pair of inner arm assemblies 130a, 130b, however, it should be understood that the rear-view system 100 may include a single outer and inner arm assemblies or any number of outer and inner arm assemblies 110a, 110b, 130a, 130b.

As shown in FIG. 5, the rear-view system 100 further includes a pair of driving pinion gears 132a, 132b. Each driving pinion gear 132a, 132b is rotatably supported within the rear-view head 104 (or the case frame 112) in a position in line with a respective inner arm assembly 130a, 130b from the pair of inner arm assemblies 130a, 130b and engaging a respective rack 116a, 116b from the racks 116a, 116b of the outer arm assemblies 110a, 110b. In some examples, the racks 116a, 116b are defined by teeth on the racks 116a, 116b that engage with teeth of respective driving pinion gears 132a, 132b.

In some examples, the pinion drive shaft assembly 114 includes a drive shaft 122 extending between the pair of driving pinion gears 132a, 132b along a drive axis D-D'. In some examples, the drive axis D-D' is substantially perpendicular to the racks 116a, 116b. In some other examples, the drive shaft 122 may be disposed at an oblique angle with respect to the racks 116a, 116b.

In some examples, the rear-view system 100 further includes a pair of spaced apart hubs 164a, 164b. The hubs 164a, 164b define respective apertures that lockably receive the drive shaft 122 therein. The hubs 164a, 164b also define outer bearing surfaces that engage with the rear-view head 104 or the case frame 112. In some examples, the outer bearing surfaces engage with inner arm bodies 131a, 131b of the respective inner arm assemblies 130a, 130b.

Figure 6A:
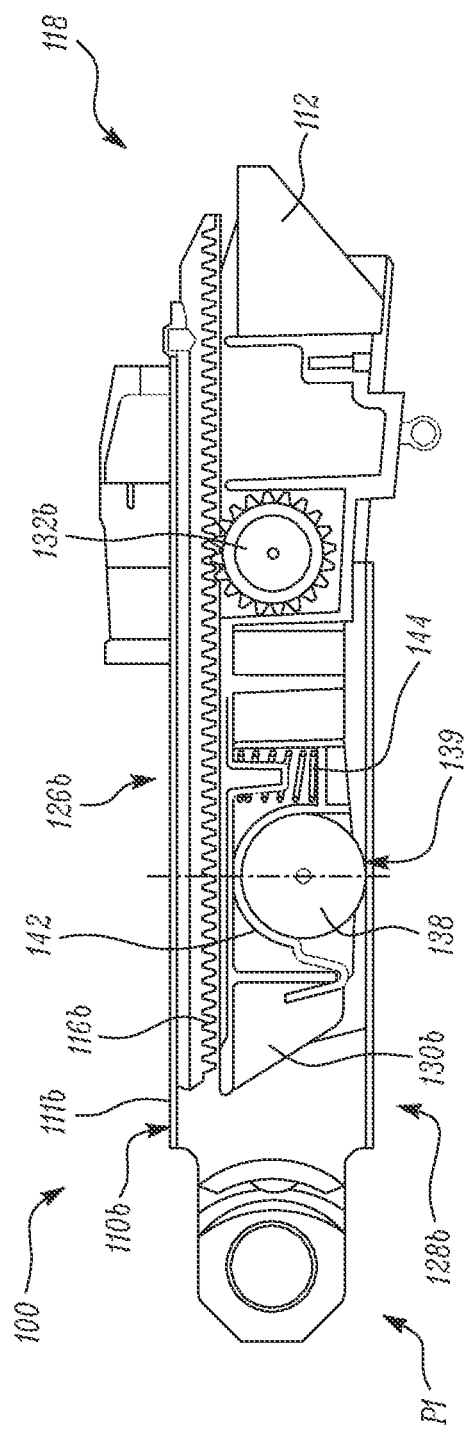
FIGS. 6A and 6B illustrate respective cross-sectional views of the rear-view system in different configurations taken along a section line A-A' shown in FIG. 4, according to an embodiment of the present disclosure.
Figure 6B:
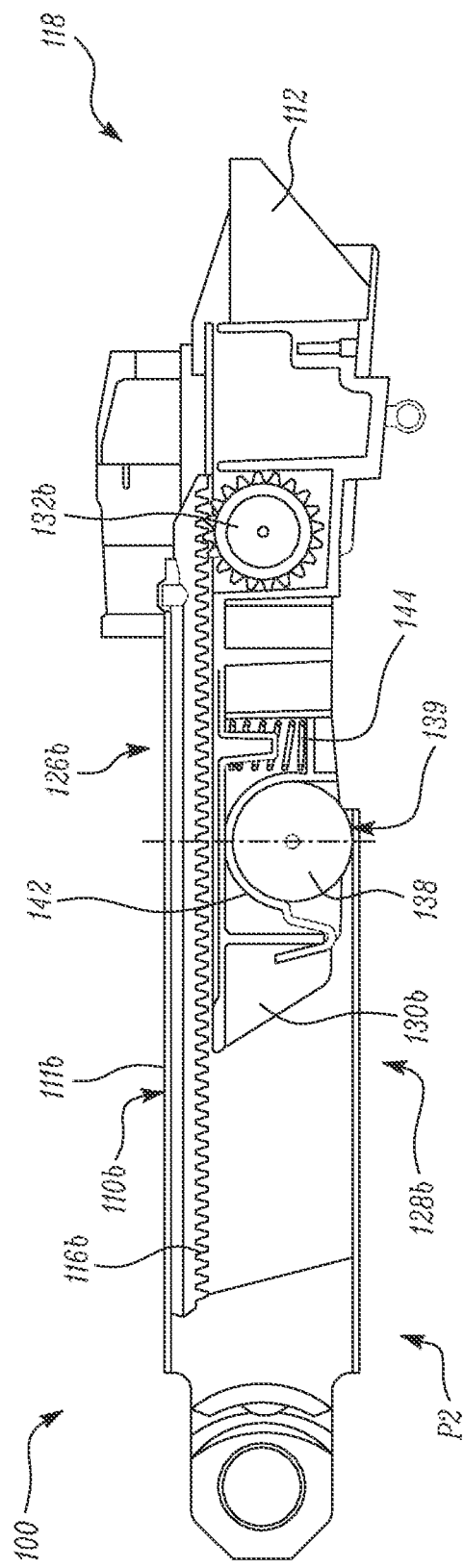

FIGS. 6A and 6B illustrate respective cross-sectional views of the rear-view system 100 taken along a section line A-A' shown in FIG. 4. Additionally, FIGS. 6A and 6B illustrate the rear-view system 100 in the retracted position P1 and the extended position P2, respectively. Referring now to FIGS. 4-6B, each outer arm assembly 110a, 110b includes a front portion 126a, 126b and a rear portion 128a, 128b. Each inner arm assembly 130a, 130b also includes a front portion 134a, 134b and a rear portion 136a, 136b. The front and rear portions 134a, 134b, 136a, 136b of the respective inner arm assemblies 130a, 130b are more clearly visible in FIG. 5. In FIGS. 6A and 6B, only the outer arm assembly 110b and the inner arm assembly 130b are visible. The front portion 126b of the outer arm assembly 110b includes the rack 116b extending longitudinally along the outer arm assembly 110b towards the distal end 118. The driving pinion gear 132b engages the rack 116b of the outer arm assembly 110b and the case frame 112 (or the rear-view head 104 shown in FIGS. 1A-3) such that the rear-view head 104 is movable between the retracted position P1 and the extended position P2 based on relative movement between the driving pinion gear 132b and the rack 116b.

In some examples, the inner arm assembly 130b includes an intermediate contact surface in the form of a periphery 139 of a wheel 138 (shown in FIGS. 6A and 6B). In some examples, the wheel 138 is mounted towards the rear portion 128b of the outer arm assembly 110b. In some examples, the intermediate contact surface, (i.e., the periphery 139 of the wheel 138) runs along the rear portion 128b of the outer arm assembly 110b. In some examples, the wheel 138 is rotatably mounted on a carrier 142 of the inner arm assembly 130b.

In some examples, the carrier 142 is pivotally mounted on the inner arm assembly 130b for rotation about an axis substantially parallel to the drive axis D-D' (shown in FIG. 5). A coil spring 144 mounted between the inner arm assembly 130b and the carrier 142 biases the wheel 138, and hence, the intermediate contact surface (i.e., the periphery 139) into engagement with the rear portion 128b of the outer arm assembly 110b. The intermediate contact surface may minimise vibration of the rear-view head 104 (shown in FIGS. 1A-3), and hence, the rear-view system 100. This may enhance stability between the inner and outer arm assemblies 130a, 130b, 110a, 110b even with substantial manufacturing tolerance. It should be understood that a shape of the intermediate contact surface may vary based on application requirements. Further, it should be understood that the components shown in FIGS. 6A and 6B with respect to the inner and outer arm assemblies 130b, 110b are equally applicable to the inner and outer arm assemblies 130a, 110a.

Referring again to FIGS. 1A-5, the rear-view system 100 further includes a gear 124 mounted on the drive shaft 122 and rotatably coupled to the drive shaft 122. The gear 124 may rotate along with the drive shaft 122 based on rotation of the pair of driving pinion gears 132a. 132b that are in engagement with the respective racks 116a, 116b and the pair of driving pinion gears 132a, 132b may rotate as the case frame 112 (or the rear-view head 104) is moved between the retracted position P1 and the extended position P2.

The rear-view system 100 further includes a position sensor 140 (shown in FIG. 5) configured to generate a signal indicative of a telescopic position of the rear-view head 104 with respect to the bracket 102. In some examples, the position sensor 140 may sense any telescopic position of the rear-view head 104 with respect to the bracket 102 including the retracted position P1 and the extended position P2. In some examples, the position sensor 140 includes a potentiometer 146 configured to output a varying voltage based on the telescopic position of the rear-view head 104 with respect to the bracket 102. The position sensor 140 and/or the potentiometer 146 may be communicably connected to the processor 120 by a wire 147. Other forms of communicable connections are also contemplated including wired and wireless connectivity described in this disclosure.

As used herein, the term "potentiometer" may generally include any device adapted to vary resistance, voltage, or current within a circuit and may include, but is not limited to, manually adjustable potentiometers, digitally adjustable potentiometers, variable resistors, or a combination thereof. Further, the term may represent any type of potentiometer, e.g., a linear potentiometer, a rotary potentiometer, etc. Potentiometers may typically include at least a two-terminal resistor, e.g., a three-terminal resistor having three terminals or contacts. Two terminals may represent end terminals and at least one other terminal may be movable (slidably or rotatably) to vary resistance as is measured with respect to it and either one of the end terminals. Alternatively, the use of the term potentiometer may also refer to an equivalent device, such as a Hall Effect sensor, that provides an output signal representing a position of the component to which it is operatively coupled.

In some examples, the potentiometer 146 is operatively coupled to the gear 124. The potentiometer 146 may output a varying voltage corresponding to a rotational position of the gear 124, and thus, the telescopic position of the rear-view head 104 (or the case frame) with respect to the bracket 102.

It should be understood that the position sensor 140 may be of any type known to a person skilled in the art as long as the position sensor 140 is capable of detecting the telescopic position of the rear-view head 104. Output from the position sensor 140 may be a unique signal for that actual position, or a unique signal for that actual position with reference to a predetermined position, or other signals as the position changes with reference to a predetermined position.

Figure 7B:
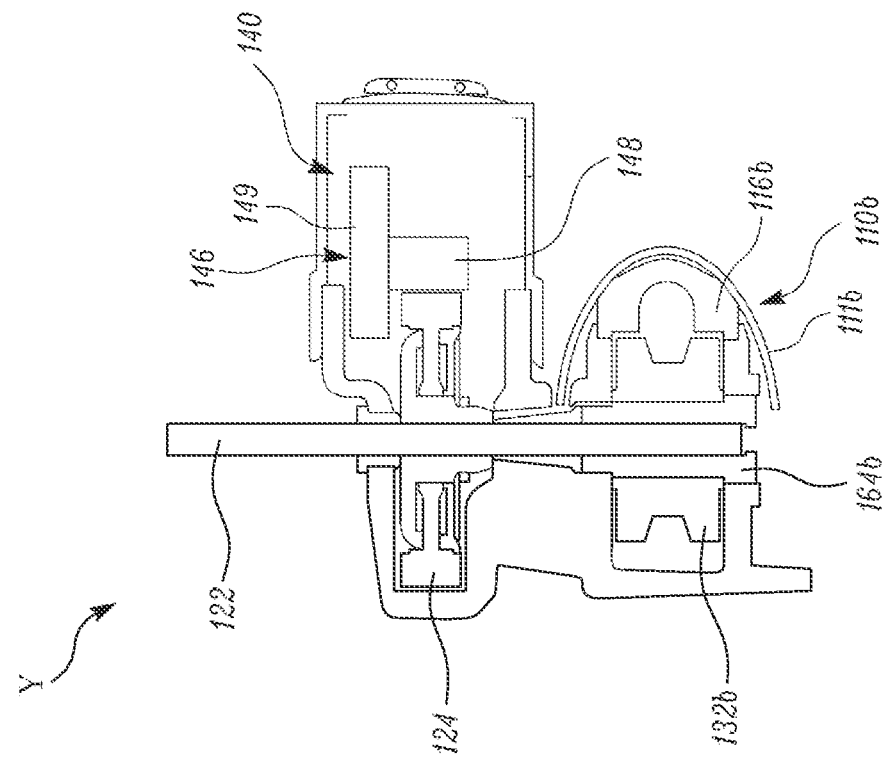
FIG. 7B illustrates an enlarged cross-sectional view of a section Y of the rear-view system of FIG. 7A, according to an embodiment of the present disclosure.
Figure 7A:
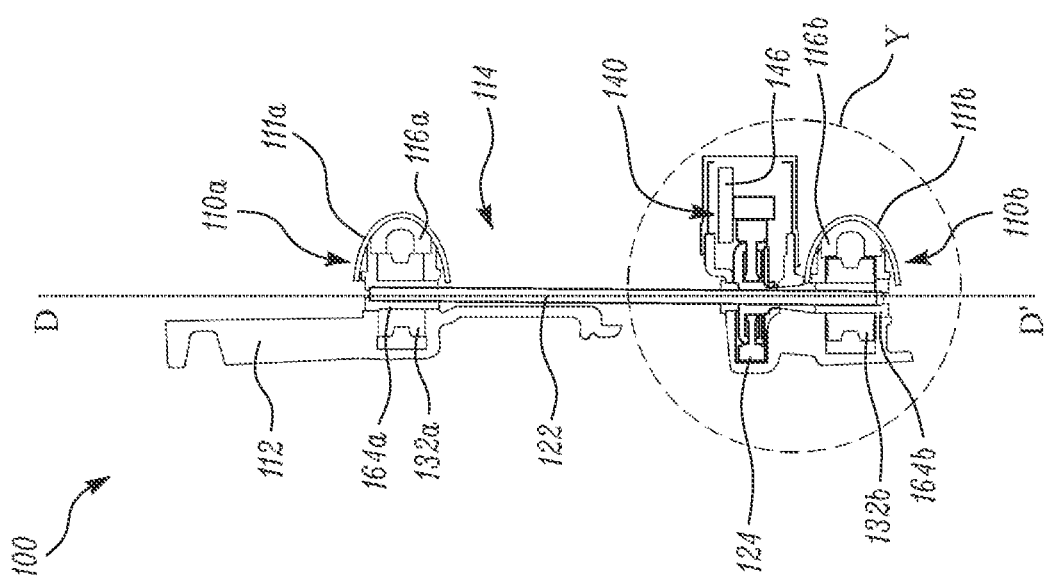
FIG. 7A illustrates a cross-sectional view of the rear-view system taken along a line B-B' shown in FIG. 4, according to an embodiment of the present disclosure.

FIG. 7A illustrates a cross-sectional view of the rear-view system 100 taken along a section line B-B' shown in FIG. 4. The cross-sectional view represents a portion of the rear-view system 100 including the pinion drive shaft assembly 114. Some components of the rear-view system 100 are not shown for clarity. The pinion drive shaft assembly 114 includes the drive shaft 122 extending between the pair of driving pinion gears 132a, 132b along the drive axis D-D'. The gear 124 is rotatably coupled to the drive shaft 122 and operatively coupled with the position sensor 140 (or the potentiometer 146).

The hubs 164a. 164b pass through and key to their respective driving pinion gears 132a, 132b thereby securing the driving pinion gears 132a, 132b to the drive shaft 122 for rotation therewith. The hubs 164a, 164b are tapered on a leading edge and are provided with an interference fit with the drive shaft 122 allowing ease of assembly. In some examples, the drive shaft 122 may include a constant non-circular cross section that may eliminate use of splines for securing the drive shaft 122 to the driving pinion gears 132a, 132b or other drive components.

Referring now to FIGS. 1A-3 and 7A, the pair of driving pinion gears 132a, 132b engage with the respective racks 116a, 116b and rotate with the telescopic movement of the rear-view head 104 (or the case frame 112). The rotation of the pair of driving pinion gears 132a. 132b may allow rotation of the drive shaft 122 and corresponding rotation of the gear 124. Thus, the position sensor 140 may determine the telescopic position of the rear-view head 104 based on a rotational position of the gear 124.

FIG. 7B illustrates a close-up perspective view of a section Y (shown in FIG. 7A) of the rear-view system 100. The potentiometer 146 is operatively coupled to the gear 124 through any suitable engagement means. In some examples, the position sensor 140 includes a gear 148 that meshes with the gear 124. The position sensor 140 may include internal components enclosed within a housing 149, such as, for example, one or more resistive elements, one or more contacts (wiper) that move along the resistive element, one or more electrical terminals at ends of the resistive element, etc. In some examples, the contact may move along the resistive elements based on the movement of the gear 124 to output a varying volage corresponding to a position of the contact on the resistive element. Thus, the position sensor 140 may output a suitable voltage based on the rotational position of the gear 124 and the telescopic position of the rear-view head 104.

With the embodiment of the invention described above, a rack and pinion drive are used for telescopic movement of the rear-view head 104. In an alternative embodiment, a friction drive system may be used in place of the rack and pinion drive. Further, it should be understood that any type of sensor may be utilized for determining the rotational position of the gear 124 and the telescopic position of the rear-view head 104 without limiting the scope of the present disclosure.

FIG. 8 illustrates a block diagram of an example of the rear-view system 100 including the processor 120. Referring now to FIGS. 1A-2 and 8, the processor 120 is configured to receive a signal L1 from the position sensor 140. The signal L may be indicative of a telescopic position T of the rear-view head 104 with respect to the bracket 102. For example, the processor 120 may include any suitable processing means communicably coupled to the position sensor 140. In some examples, the position sensor 140 (or the potentiometer 146) may output a varying voltage V based on the telescopic position T of the rear-view head 104.

In some examples, the reflective element 106 is pivotally adjusted based on the telescopic position T of the rear-view head 104 with respect to the bracket 102. For example, the reflective element 106 may be pivotally adjusted using any suitable actuator mounted on the rear-view head 104. The actuator may include any motorized mechanisms that can pivotally adjust the reflective element 106 relative to the rear-view head 104. In some examples, the reflective element 106 may be pivotally adjusted to one or more pre-set positions based on the telescopic position T of the rear-view head 104 with respect to the bracket 102 to enhance a driver's view surrounding the vehicle.

FIG. 9A illustrates a block diagram of an example of the rear-view system 100 including the camera 108. As illustrated in FIGS. 9A and 9B, the processor 120 is configured to receive a signal L2 from the position sensor 140 (or the potentiometer 146). The processor 120 is also configured to receive at least one image I generated by the camera 108. The processor 120 may be located remotely from the camera 108, for example, in the vehicle (not shown).

Referring now to FIGS. 1A-1B, and 9A, the signal L2 may be indicative of the rotational position of the gear 124 (shown in FIG. 5), and thus, the telescopic position T of the rear-view head 104 (or the case frame 112) with respect to the bracket 102. In some examples, the position sensor 140 (or the potentiometer 146) may output the varying voltage V based on the telescopic position T of the rear-view head 104.

In some examples, the rear-view system 100 further includes a display 150 communicably coupled to the processor 120. In some examples, the display 150 may be provided in an interior of a vehicle to which the rear-view system 100 is mounted and accessible to a driver of the vehicle. The display 150 is configured to receive signals from the processor 120 for displaying one or more images or a series of images. In some instances the display 150 may be configured to receive a video generated by the camera 108. In some examples, the display 150 may be any type of display, including, but not limited to, liquid crystal displays (LCDs), light-emitting diode (LED) displays, organic LED (OLED) displays, digital light processing (DLP) displays, electroluminescent (ELD) displays, plasma display panels (PDPs), and/or the like.

In some examples, the processor 120 is configured to generate a modified image I1 by modifying the at least one image I generated by the camera 108 based on the telescopic position T of the rear-view head 104 with respect to the bracket 102. The display 150 is configured to display the modified image I1.

In some examples, the processor 120 may adjust the image I such that the modified image I1 is optimized for viewing on the display 150. For example, the processor 120 may perform suitable adjustments to the at least one image I (e.g., image cropping, resizing, rotation, etc.) corresponding to the telescopic position T of the camera 108 and the rear-view head 104, and the display 150 may display the modified image I1. Since the image I generated by the camera 108 varies with the telescopic position T of the rear-view head 104, the image I may need to be adjusted by the processor 120 for optimal viewing on the display 150. Additionally, the image I may be infinitely adjustable between the telescopic positions (the retracted position P1 and the extended position P2) of the rear-view head 104.

The processor 120 may consider the telescopic position T of the rear-view head 104 with respect to the bracket 102 to modify the image I. Thus, the processor 120 may apply adjustments to the image I that are optimized for each telescopic position T of the rear-view head 104 with respect to the bracket 102 such that the modified image I1 may be compatible with the display 150 for all the telescopic positions T of the rear-view head 104. In some examples, the processor 120 may include instructions stored within the processor 120 or otherwise accessible to the processor 120 to modify the image I based on the telescopic position T of the rear-view head 104.

In some examples, the processor 120 may include an image processing module (not shown) configured to process images I (or videos) received from the camera 108. In some examples, the modified image I1 may represent a region of interest contained within the image I. In some examples, the modified image I1 may represent an image viewed from a certain virtual viewpoint around the vehicle. In some examples, the image processing module may obtain the region of interest by cutting a portion of the image I corresponding to the region of interest. In some examples, the image processing module may select and cut off a predetermined region of the image I to obtain the modified image I1. In some examples, the image processing module may modify the image I to obtain a periphery of the vehicle substantially in real time based on the telescopic position T of the rear-view head 104. In some examples, the processor 120 may additionally include features, such as image feature detection algorithms (e.g., Scale Invariant Fourier Transform or Speeded Up Robust Feature algorithms) in order to identify common image features (e.g., road signs, road edges, etc.).

In some examples, a field of view of the camera 108 is adjusted based on the telescopic position T of the rear-view head 104 with respect to the bracket 102. Thus, the processor 120 may be adjusted for optimum field of view for the driver of the vehicle based on the position of camera 108 (and the rear-view head 104) with respect to the bracket 102 or the vehicle. In some examples, the processor 120 may adjust the field of view of the camera 108 based on the signal L2 received from the position sensor 140.

In some examples, the position sensor 140 or the potentiometer 146 includes a slip clutch 152. The slip clutch 152 may be integrated into the housing 149 (shown in FIG. 7B) of the potentiometer 146. The slip clutch 152 may help during assembly of the rear-view system 100, such that prior to installation of the rear-view head 104, the potentiometer 146 may be set to an initial position (or the retracted position P1) of the rear-view head 104. During installation of the rear-view head 104, the slip clutch 152 may allow slipping of the potentiometer 146 as the pair of inner arm assemblies 130*a*. 130*b* (shown in FIG. 5) along with the rear-view head 104 are inserted into the outer arm assemblies 110*a*, 110*b* (shown in FIG. 5) such that the potentiometer 146 remains at its initial position. Thus, as the rear-view head 104 is fully installed at the retracted position P1, the potentiometer 146 may also remain in a correct configuration to start determining the telescopic position T of the rear-view head 104. During normal operation of the rear-view head 104, the slip clutch 152 may provide adequate resistance to prevent any additional slipping. It should be understood that any type of slip clutch 152 may be utilized with the potentiometer 146 without limiting the scope of the present disclosure.

FIG. 9B illustrates a block diagram of another example of the rear-view system 100 including the processor 120. Referring now to FIGS. 1A-1B, and 9B, in some examples, the camera 108 includes a plurality of cameras 108*a*, 108*b*, 108*c* (collectively, the camera 108). The plurality of cameras 108*a*, 108*b*, 108*c* is configured to generate respective images 12, 13, 14. In some examples, the images 12, 13, 14 may be modified by the processor 120 based on the telescopic position T of the rear-view head 104 with respect to the bracket 102 to generate corresponding modified images 15, 16, 17. In some examples, the plurality of cameras 108*a*, 108*b*, 108*c* have corresponding fields of views. In some examples, the field of view of each camera 108*a*, 108*b*, 108*c* may be adjusted separately based on the telescopic position T of the rear-view head 104 with respect to the bracket 102.

In the illustrated embodiment of FIG. 9B, only three cameras 108*a*, 108*b*, 108*c* are shown for the purpose of illustration, however, the plurality of cameras 108 may include any number of cameras 108. In some examples, some of the cameras 108*a*, 108*b*, 108*c* from the plurality of cameras 108 may face in at least one of the forward direction M1, the rearward direction M2, the outward direction M3, and the downward direction M4 with respect to the vehicle. In some examples, a composite image may be generated by combining images obtained from the plurality of cameras 108*a*, 108*b*, 108*c*. In some examples, the display 150 may output modified images 15, 16, 17 corresponding to each camera 108*a*, 108*b*, 108*c* from the plurality of cameras 108. The images 12, 13, and 14 modified by the processor 120 may be configured to be shown on the display 150. Additionally, the composite image generated by combining the images 12, 13, and 14 plurality of cameras 108*a*, 108*b*, and 108*c* and then modified by the processor 120 and configured to be shown on the display 150. It is also contemplated that the composite image may show a single image on the display 150 showing a field of view from all the cameras 108*a*, 108*b*, and 108*c*.

Figure 10:
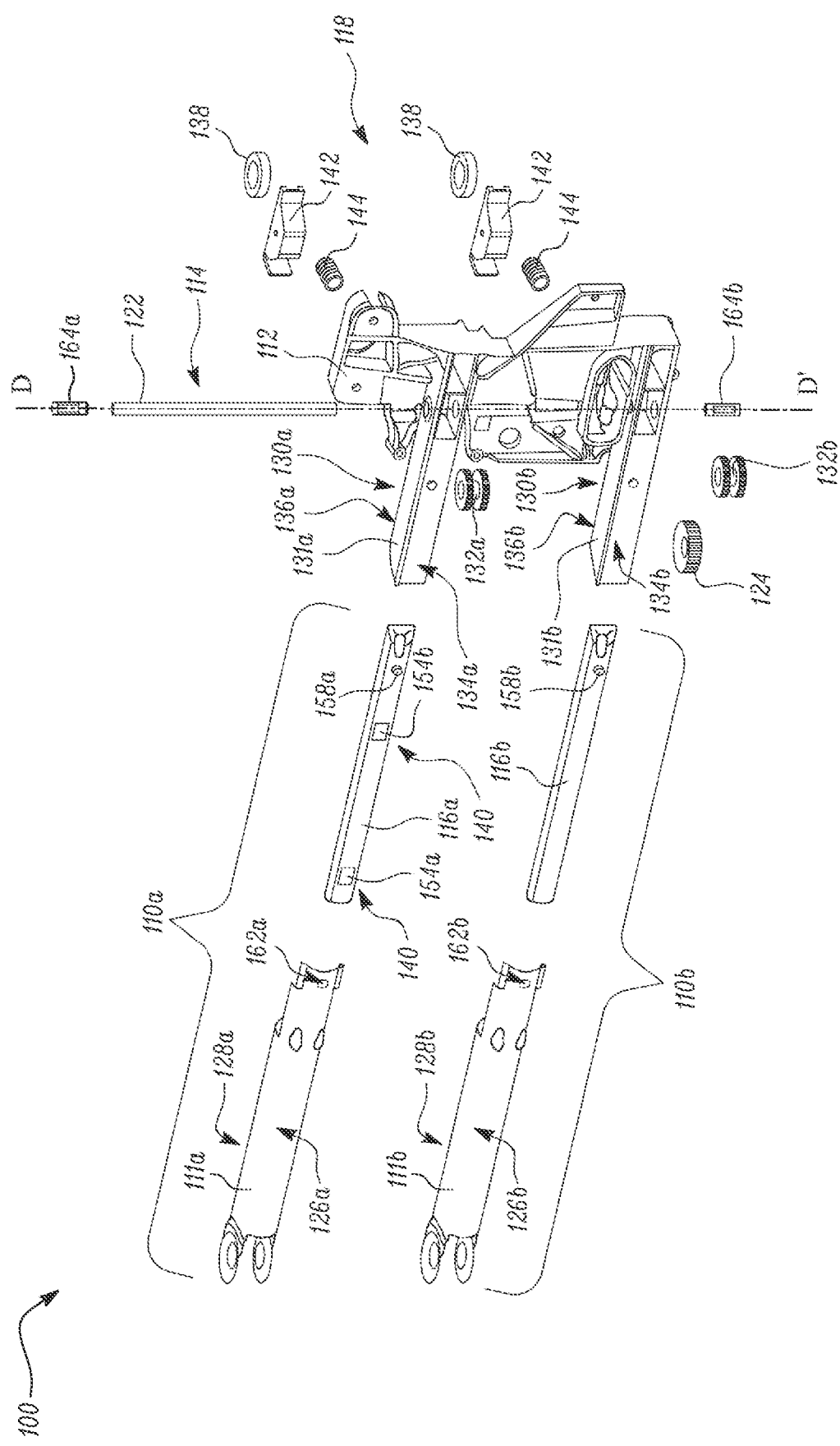
FIG. 10 illustrates an exploded schematic perspective view of the rear-view system, according to another embodiment of the present disclosure.

FIG. 10 illustrates an example of the rear-view system 100, according to another embodiment of the present disclosure. In the illustrated example of FIG. 10, the position sensor 140 is mounted on one of the pair of outer arm assemblies 110*a*, 110*b*. In some examples, the position sensor 140 is mounted on the rack 116*a* of the outer arm assembly 110*a*. Specifically, the position sensor 140 includes a limit switch 154*a*, 154*b* configured to sense whether the rear-view head 104 (shown in FIGS. 1A-3) or the case frame 112 is at the retracted position P1 (shown in FIG. 1A) or the extended position P2 (shown in FIG. 1B). In the illustrated example of FIG. 10, the limit switch 154*a* is shown corresponding to the retracted position P1 and the limit switch 154*b* is shown corresponding to the extended position P2.

In general, a limit switch is a switch operated by motion of a system's element (e.g., the rear-view head 104 or the case frame 112) or presence of an object. For example, the limit switch may be an electromechanical device that includes an actuator mechanically linked to a set of contacts and configured to detect when the system's element has travelled/moved to a certain position. It should be understood that the position sensor 140 may include any type of switch or device capable of detecting the telescopic position T of the rear-view head 104.

Figure 9:
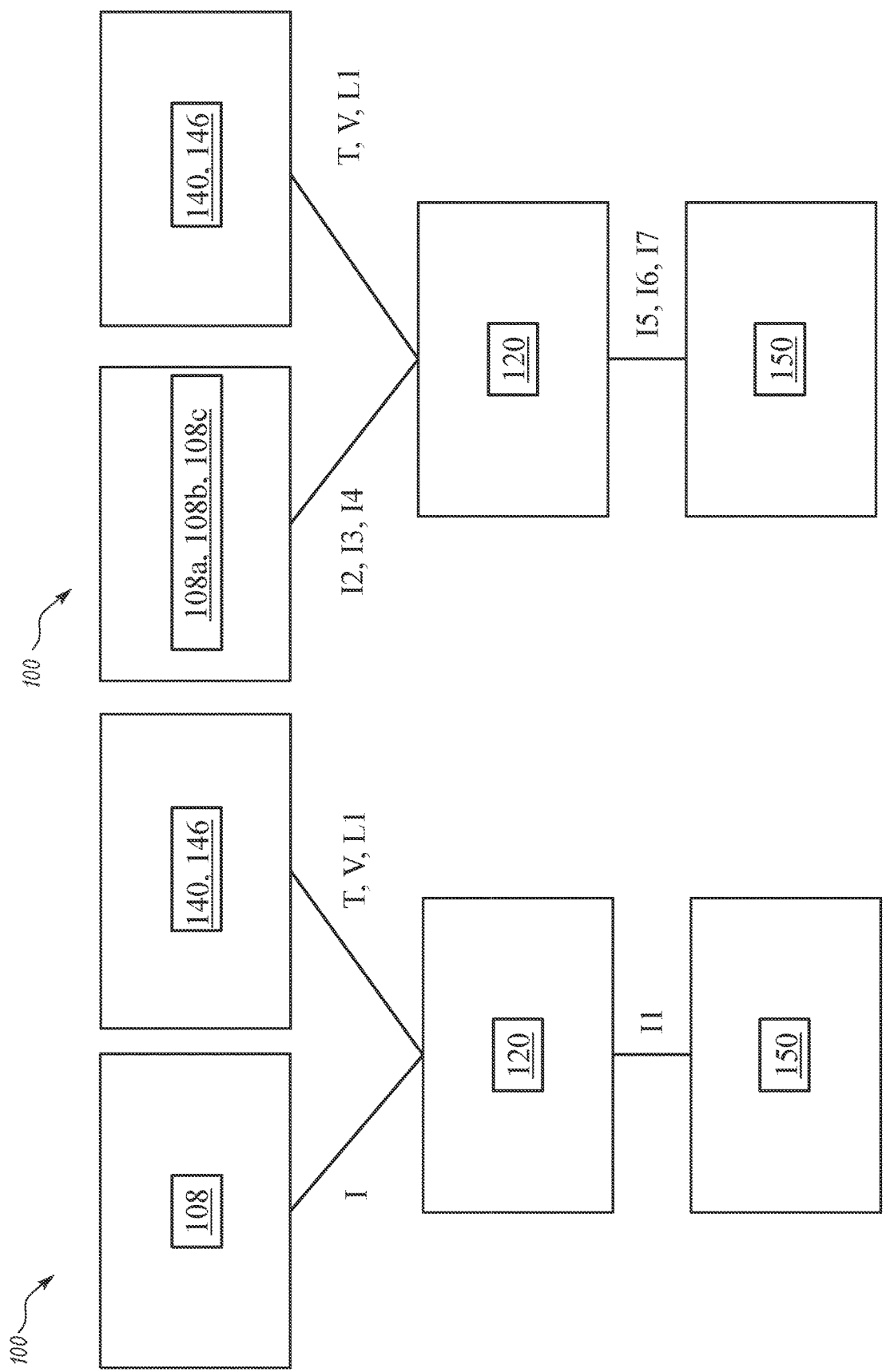
FIGS. 9A and 9B illustrate block diagrams of the rear-view system including the camera(s), according to embodiments of the present disclosure.

Referring now to FIGS. 9 and 10, in some embodiments where the rear-view system 100 includes the camera 108, the processor 120 may be further configured to modify the at least one image I generated by the camera 108 based on a first setting or a second setting. In some examples, the first setting corresponds to the retracted position P1 and the second setting S2 corresponds to the extended position P2. Thus, the processor 120 may modify the image I to generate the modified image I1 based on whether the rear-view head 104 or the camera 108 is at one of the extreme positions, i.e., the retracted position P1 (shown in FIG. 1A) or the extended position P2 (shown in FIG. 1B). In alternative embodiments, the limit switch 154*a*, 154*b* may be mounted on the outer tubes 111*a*, 111*b* of the respective outer arm assemblies 110*a*, 110*b* such that the limit switch 154*a*, 154*b* may indicate the telescopic position (i.e., the retracted position P1 or the extended position P2) of the rear-view head 104 when the rear-view head 104 engages with the limit switches 154*a*, 154*b*.

Figure 11:
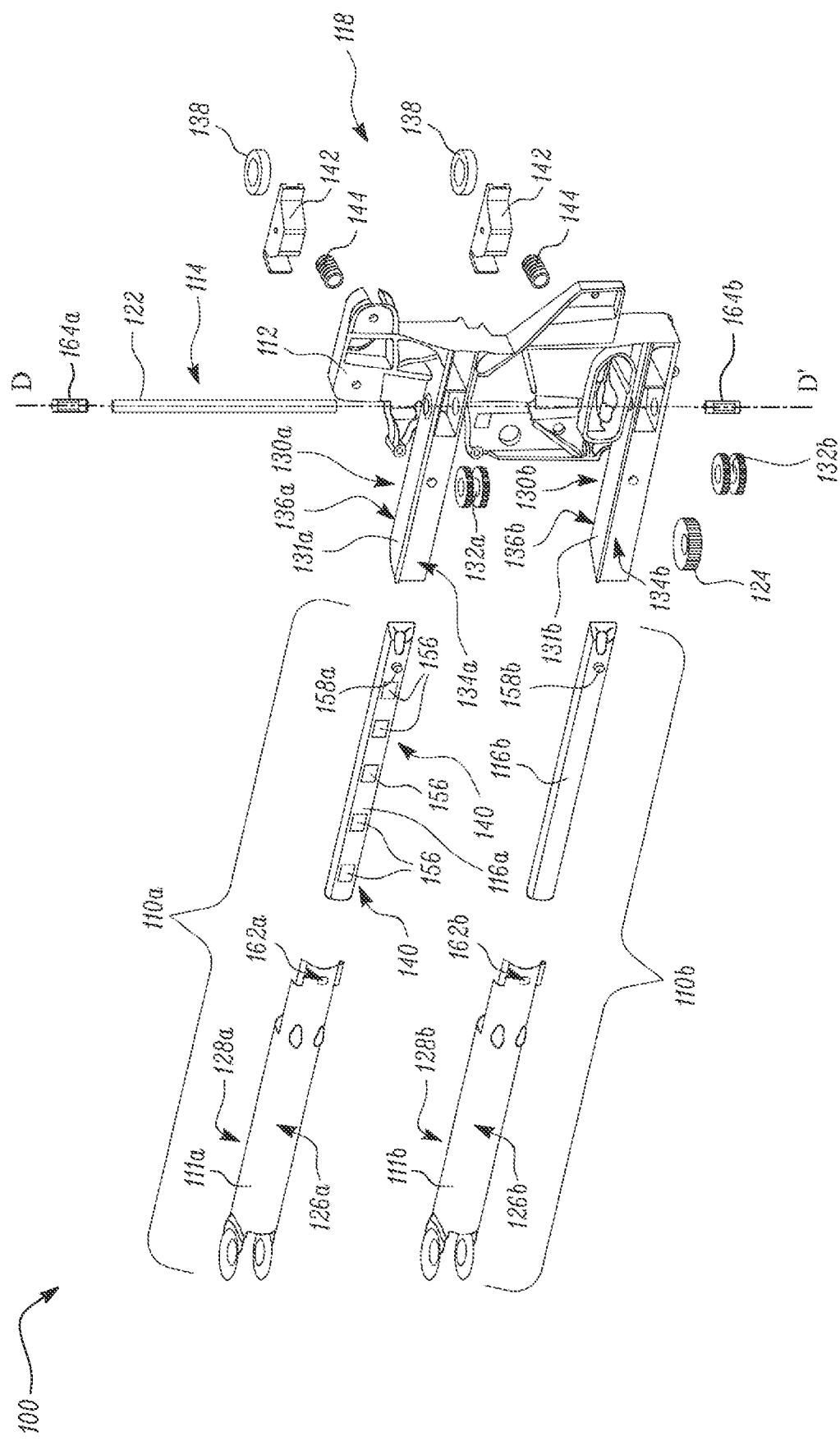
FIG. 11 illustrates an exploded schematic perspective view of the rear-view system, according to another embodiment of the present disclosure.

FIG. 11 illustrates an example of the rear-view system 100, according to another embodiment of the present disclosure. In some examples, the position sensor 140 includes a plurality of contact switches 156 configured to sense a plurality of telescopic positions of the rear-view head 104 (shown in FIGS. 1A-3). The plurality of contact switches 156 is interchangeably referred to hereinafter as "the contact switches 156". In the illustrated example of FIG. 11, the contact switches 156 are mounted on the rack 116*a* of the outer arm assembly 110*a*. In some examples, the contact switches 156 are distributed at equal intervals on the rack 116*a*. It should be understood that the number of contact switches 156 may vary based on application requirements. In some embodiments, the position sensor 140 may be mounted on one of the pair of inner arm assemblies 130*a*, 130*b*. In some embodiments, the position sensor 140 may be mounted on the rear-view head 104 (shown in FIGS. 1A-3) or the case frame 112. In some other embodiments, the position sensor 140 may be mounted on the bracket 102 (shown in FIGS. 1A-3).

Referring now to FIGS. 8 and 11, in some embodiments where the rear-view system 100 includes the camera 108, the processor 120 may be further configured to modify the at least one image I generated by the camera 108 based on one of a plurality of settings corresponding to the plurality of telescopic positions of the rear-view head 104. Each setting may correspond to a telescopic position T of the rear-view head 104.

Figure 12:
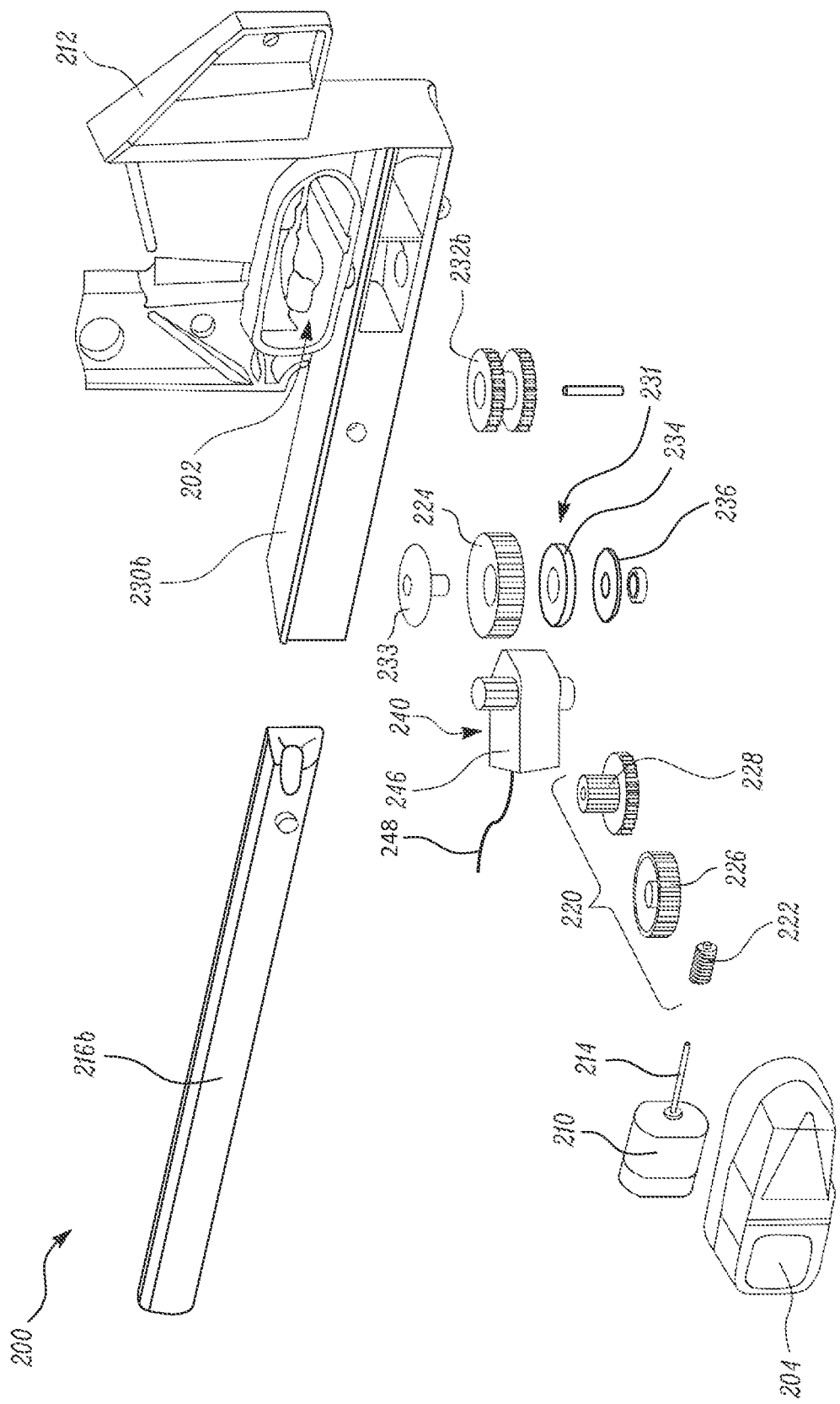
FIG. 12 illustrates an exploded schematic perspective view of a rear-view system for a vehicle, according to another embodiment of the present disclosure.

FIG. 12 illustrates an example of a rear-view system 200 for a vehicle, according to another embodiment of the present disclosure. The rear-view system 200 is substantially similar in structure to the rear-view system 100 described with reference to FIGS. 1A-11 and similar reference numbers are used to designate same or similar elements. However, the rear-view system 200 is electrically powered instead of being actuated manually. For example, the rear-view system 200 is a powered telescoping rear-view system having an electrical drive mechanism for automatically adjusting a rear-view head (e.g., the rear-view head 104 of FIGS. 1A-3) of the rear-view system 200. The electrical drive mechanism may move the rear-view head between a retracted position (e.g., the retracted position P1) and an extended position (e.g., the extended position P2). Only some components of the rear-view system 200 are shown for the purpose of illustration.

The rear-view system 200 includes a case frame 212 that couples to the rear-view head of the rear-view system 200. The rear-view system 200 further includes an inner arm assembly 230b mounted to the rear-view head or the case frame 212. Only one inner arm assembly 230b is shown in FIG. 12. The rear-view system 200 further includes a driving pinion gear 232b. Only one driving pinion gear 232b is shown in FIG. 12. The driving pinion gear 232b is rotatably supported within the rear-view head or the case frame 212 in a position in line with the inner arm assembly 230b and engages a rack 216b of an outer arm assembly (e.g., the outer arm assembly 110b shown in FIG. 5). The rear-view system 200 further includes a pinion drive shaft assembly (e.g., the pinion drive shaft assembly 114 shown in FIGS. 4 and 7A) mounted to the rear-view head or the case frame 212.

The rear-view system 200 further includes a drive motor 210 mounted to the rear-view head. The drive motor 210 includes an output shaft 214. The rear-view system 200 further includes a gear train 220 operatively interposed between the output shaft 214 and the pinion drive shaft assembly. The drive motor 210 drives the inner arm assembly 230b to move telescopically with respect to the outer arm assembly. Specifically, the drive motor 210 drives the gear train 220 that in turn rotates a gear 224 and the pinion drive shaft assembly transmits the motor power to the driving pinon gear 232b that moves the inner arm assembly 230b telescopically with respect to the outer arm assembly. Rotation of the driving pinon gear 232b on the rack 216b drives the inner arm assembly 230b inwards and outwards telescopically, moving the rear-view head towards and away from a bracket (e.g., the bracket 102 of FIGS. 1A-3), respectively. In some examples, the drive motor 210 and the gear train 220 are enclosed within a housing 202 covered by a housing cover 204.

In the illustrated example of FIG. 12, the gear train 220 includes a worm gear 222, a first gear 226, and an intermediate gear assembly 228. The intermediate gear assembly 228 meshes with the gear 224 of the rear-view system 200. The worm gear 222 meshes with the first gear 226 to drive the first gear 226 that in turn drives the intermediate gear assembly 228 and the gear 224 is driven by the intermediate gear assembly 228. The gear 224 is coupled to the pinion drive shaft assembly that rotates the driving pinion gear 232b for telescopic movement of the rear-view head or the case frame 212.

The rear-view system 200 further includes a position sensor 240 operatively coupled to the gear train 220 for sensing a telescopic position of the rear-view head with respect to the bracket. Specifically, the position sensor 240 is operatively coupled to the gear 224. In some examples, the position sensor 240 includes a potentiometer 246 configured to output a varying voltage based on a rotary position of the gear train 220 with respect to the bracket. Specifically, the potentiometer 246 is configured to output the varying voltage based on a rotary position of the gear 224 with respect to the bracket. The position sensor 240 and/or the potentiometer 246 may be communicably connected to the processor 120 by a wire 248. Other forms of communicable connections are also contemplated including wired and wireless connectivity described in this disclosure.

The rear-view system 200 further includes a clutch assembly 231 mounted on the gear 224. The clutch assembly 231 may allow the rear-view system 200 to be manually overridden without damaging the components of the gear train 220. In some examples, the clutch assembly 231 includes a drive plate 233 and a drive plate slave 234 clamped to the drive plate 233 by a disc spring 236. The drive plate 233 is keyed to a drive shaft (e.g., the drive shaft 122 of FIGS. 4, 5, and 7A). The drive plate slave 234 and drive plate 233 are mutually shaped to prevent relative rotation. A friction between an outer periphery of the drive plate 233, the drive plate slave 234 and a disc surface of the gear 224 provides the required drive torque and allows slippage for manual override.

During powered rotation, the clutch assembly 231 rotates with the pinion drive shaft assembly translating power to the driving pinion gear 232b to telescopically extend/retract the rear-view head. When the rear-view head is extended or retracted manually, the clutch assembly 231 provides the necessary slippage between the gear 224 and the pinion drive shaft assembly, and thus, prevents back-driving of the position sensor 240 and/or the drive motor 210.

It should be understood that the above-described drive motor 210 and the gear train 220 are merely illustrative of a suitable drive that may be used for powering the rear-view system 200. Further, it should be understood that any other suitable type of drive may be used for supplying power, such as belt pulley drives, hydraulic drives, pneumatic drives, variable speed drives, eddy-current drives, and/or the like.

Although the powered telescoping rear-view system is described with reference to FIG. 12, it may also be implemented in alternate embodiments, including the embodiments described in FIGS. 1A to 11.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited by the claims and the equivalents thereof.

Furthermore, the features of the disclosure disclosed in this specification, the claims and the drawings may be employed both individually and in any possible combination for practicing the disclosure in its various exemplary embodiments. In particular, all claim feature combinations, irrespective of the claim dependencies, are covered with this application.

REFERENCE SIGNS

100 Rear-view System
102 Bracket

104 Rear-view Head
106 Reflective Element
106a Primary Reflective Element
106b Secondary Reflective Element
108 Camera
108a Camera
108a Camera
108c Camera
110a Outer Arm Assembly
110b Outer Arm Assembly
111a Outer Tube
111b Outer Tube
112 Case Frame
114 Pinion Drive Shaft Assembly
116a Rack
116b Rack
118 Distal End
120 Processor
122 Drive Shaft
124 Gear
126a Front Portion
126b Front Portion
128a Rear portion
128b Rear portion
130a Inner Arm assembly
130b Inner Arm assembly
131a Inner Arm Body
131b Inner Arm Body
132a Driving Pinion Gear
132b Driving Pinion Gear
134a Front Portion
134b Front Portion
136a Rear portion
136b Rear portion
138 Wheel
139 Periphery
140 Position Sensor
142 Carrier
144 Coil Spring
146 Potentiometer
147 Wire
148 Gear
149 Housing
150 Display
152 Slip Clutch
154a Limit Switch
154b Limit Switch
156 Contact Switches
158a Projection
158b Projection
162a Hole
162b Hole
164a Hub
164b Hub
200 Rear-view System
202 Housing
204 Housing Cover
210 Drive Motor
212 Case frame
214 Output Shaft
216b Rack
220 Gear Train
222 Worm Gear
224 Gear
226 First Gear
228 Intermediate Gear Assembly
230b Inner Arm Assembly
231 Clutch Assembly
232b Driving Pinion Gear
233 Drive Plate
234 Drive Plate Slave
236 Disc Spring
240 Position Sensor
246 Potentiometer
248 Wire
A-A' Section Line
B-B' Section Line
D-D' Drive Axis
I Image
I1 Modified Image
I2 Image
I3 Image
I4 Image
I5 Modified Image
I6 Modified Image
I7 Modified Image
L1 Signal
L2 Signal
M1 Forward direction
M2 Rearward direction
M3 Outward direction
M4 Downward direction
P1 Retracted Position
P2 Extended Position
T Telescopic Position
V Voltage
X1 Arrow
X2 Arrow
Y Section It is claimed:

1. A rear-view system for a vehicle, the rear-view system comprising:
a bracket mountable to the vehicle;
a rear-view head telescopically mounted to the bracket;
at least one of a reflective element or a camera, wherein the at least one of the reflective element or the camera is mounted on the rear-view head and the at least one of the reflective element or the camera is movable with the rear-view head; and
a position sensor configured to generate a signal indicative of a telescopic position of the rear-view head with respect to the bracket,
wherein the signal from the position sensor is sent to a processor, and
wherein the position sensor comprises a potentiometer configured to output a varying voltage based on the telescopic position of the rear-view head with respect to the bracket.

2. The rear-view system of claim 1, wherein the processor is communicably coupled to the camera, wherein the processor is operable to receive the signal from the position sensor and at least one image generated by the camera, and wherein the processor is configured to generate at least one modified image by modifying the at least one image generated by the camera based on the telescopic position of the rear-view head with respect to the bracket.

3. The rear-view system of claim 2, further comprising a display communicably coupled to the processor, wherein the display is configured to display the at least one modified image.

4. The rear-view system of claim 2, wherein the processor is remote from the camera and the rear-view head.

5. The rear-view system of claim 1, wherein the potentiometer comprises a slip clutch.

6. The rear-view system of claim 1, further comprising:
a pair of spaced apart substantially parallel hollow outer arm assemblies extending from the bracket, each outer arm assembly having a front portion and a rear portion, the front portion having a rack extending longitudinally along the outer arm assembly towards a distal end;
a pair of spaced apart substantially parallel inner arm assemblies mounted to the rear-view head and extending into respective outer arm assemblies for relative sliding movement out of and into the respective outer arm assemblies; and
a pair of driving pinion gears, each driving pinion gear rotatably supported within the rear-view head in a position in line with a respective inner arm assembly from the pair of respective inner assemblies and engaging a respective rack from the racks of the outer arm assemblies.

7. The rear-view system of claim 6, wherein the position sensor is mounted on one of the pair of inner arm assemblies.

8. The rear-view system of claim 6, wherein the position sensor is mounted on one of the pair of outer arm assemblies.

9. The rear-view system of claim 6, further comprising:
a pinion drive shaft assembly mounted to the rear-view head and having a drive shaft extending between the pair of driving pinion gears along a drive axis;
a drive motor mounted to the rear-view head, the drive motor having an output shaft; and
a gear train operatively interposed between the output shaft and the pinion drive shaft assembly, the drive motor driving the inner arm assemblies to move telescopically with respect to their respective outer arm assemblies.

10. The rear-view system of claim 1, wherein the reflective element is pivotally mounted on the rear-view head.

11. The rear-view system of claim 10, wherein the reflective element is pivotally adjusted based on the telescopic position of the rear-view head with respect to the bracket.

12. The rear-view system of claim 1, wherein the camera faces in at least one of a forward direction, a rearward direction, an outward direction, and a downward direction with respect to the vehicle.

13. The rear-view system of claim 1, wherein a field of view of the camera is adjusted based on the telescopic position of the rear-view head with respect to the bracket.

14. The rear-view system of claim 1, wherein the camera comprises a plurality of cameras having corresponding fields of view.

15. The rear-view system of claim 1, further comprising:
a pair of spaced apart substantially parallel hollow outer arm assemblies extending from the bracket, each outer arm assembly having a front portion and a rear portion, the front portion having a rack extending longitudinally along the outer arm assembly towards a distal end;
a pair of spaced apart substantially parallel inner arm assemblies mounted to the rear-view head and extending into respective outer arm assemblies for relative sliding movement out of and into the respective outer arm assemblies; and
a pair of driving pinion gears, each driving pinion gear rotatably supported within the rear-view head in a position in line with a respective inner arm assembly from the pair of respective inner assemblies and engaging a respective rack from the racks of the outer arm assemblies.

16. The rear-view system of claim 1, wherein the reflective element is pivotally mounted on the rear-view head.

17. The rear-view system of claim 1, further comprising:
a pair of spaced apart substantially parallel hollow outer arm assemblies extending from the bracket, each outer arm assembly having a front portion and a rear portion, the front portion having a rack extending longitudinally along the outer arm assembly towards a distal end;
a pair of spaced apart substantially parallel inner arm assemblies mounted to the rear-view head and extending into respective outer arm assemblies for relative sliding movement out of and into the respective outer arm assemblies; and
a pair of driving pinion gears, each driving pinion gear rotatably supported within the rear-view head in a position in line with a respective inner arm assembly from the pair of respective inner assemblies and engaging a respective rack from the racks of the outer arm assemblies.

18. The rear-view system of claim 1, wherein the reflective element is pivotally mounted on the rear-view head.

19. A rear-view system for a vehicle, the rear-view system comprising:
a bracket mountable to the vehicle;
a rear-view head telescopically mounted to the bracket;
at least one of a reflective element or a camera, wherein the at least one of the reflective element or the camera is mounted on the rear-view head and the at least one of the reflective element or the camera is movable with the rear-view head; and
a position sensor configured to generate a signal indicative of a telescopic position of the rear-view head with respect to the bracket,
wherein the signal from the position sensor is sent to a processor, and
wherein the rear-view head is telescopically movable with respect to the bracket between at least one retracted position and an extended position, and wherein the position sensor comprises at least one limit switch configured to sense whether the rear-view head is at the retracted position or the extended position.

20. A rear-view system for a vehicle, the rear-view system comprising:
a bracket mountable to the vehicle;
a rear-view head telescopically mounted to the bracket;
at least one of a reflective element or a camera, wherein the at least one of the reflective element or the camera is mounted on the rear-view head and the at least one of the reflective element or the camera is movable with the rear-view head; and
a position sensor configured to generate a signal indicative of a telescopic position of the rear-view head with respect to the bracket,
wherein the signal from the position sensor is sent to a processor, and
wherein the position sensor comprises a plurality of contact switches configured to sense a plurality of telescopic positions of the rear-view head.

* * * * *